US012763607B2

(12) United States Patent
Park et al.

(10) Patent No.: US 12,763,607 B2
(45) Date of Patent: Oct. 13, 2026

(54) DEVICE AND METHOD FOR WIRELESS POWER TRANSMISSION IN ELECTRONIC DEVICE

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Jaehyoung Park, Suwon-si (KR); Seungyoung Ahn, Yuseong-gu (KR); Yujun Shin, Gunpo-si (KR); Seongho Woo, Yuseong-gu (KR); Minseok Kim, Suwon-si (KR); Younho Kim, Suwon-si (KR); Bumhee Bae, Suwon-si (KR); Yeonsik Yu, Suwon-si (KR); Jeongnam Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/239,263

(22) Filed: Jun. 16, 2025

(65) Prior Publication Data

US 2025/0309694 A1 Oct. 2, 2025

Related U.S. Application Data

(63) Continuation of application No. PCT/KR2023/020254, filed on Dec. 8, 2023.

(30) Foreign Application Priority Data

Dec. 25, 2022 (KR) ........................ 10-2022-0183859
Jan. 11, 2023 (KR) ........................ 10-2023-0004249

(51) Int. Cl.
*H02J 50/12* (2016.01)
*H01F 27/24* (2006.01)
(Continued)

(52) U.S. Cl.
CPC .............. *H02J 50/12* (2016.02); *H02J 50/70* (2016.02); *H01F 27/24* (2013.01); *H01F 27/28* (2013.01)

(58) Field of Classification Search
CPC .......... H02J 50/12; H02J 50/70; H02J 50/005; H02J 50/50; H01F 27/24; H01F 27/28
See application file for complete search history.

(56) References Cited

U.S. PATENT DOCUMENTS 8,264,369 B2 * 9/2012 Hall ...................... F16L 25/021 340/855.9
9,923,383 B2 3/2018 Ritter et al.
(Continued)

FOREIGN PATENT DOCUMENTS

CN 110971012 A 4/2020
CN 112751397 A 5/2021
(Continued)

OTHER PUBLICATIONS

International Search Report for PCT/KR2023/020254 mailed Mar. 11, 2024, 5 pages, with English translation.
(Continued)

*Primary Examiner* — Jeffrey M Shin
(74) *Attorney, Agent, or Firm* — Nixon & Vanderhye, P.C.

(57) ABSTRACT

A device and method for providing wireless power transmission in an electronic device are provided. To connect a transmitting coil with a receiving coil of the electronic device, a constant voltage supply unit may be configured such that a first capacitor, an inductor, and a second capacitor are arranged to connect an output terminal of the receiving coil and an input terminal of the transmitting coil in series, and a third capacitor may be arranged between the
(Continued)

inductor and the second capacitor to connect the inductor and the second capacitor to the ground.

20 Claims, 7 Drawing Sheets

(51) Int. Cl.
*H01F 27/28* (2006.01)
*H02J 50/70* (2016.01)

(56) References Cited

U.S. PATENT DOCUMENTS

| | | | | |
|---|---|---|---|---|
| 11,218,028 | B2 | 1/2022 | Choi et al. | |
| 12,068,619 | B2 * | 8/2024 | Nakayashiki | H02J 50/502 |
| 2011/0115430 | A1 * | 5/2011 | Saunamaki | H02J 50/12 320/108 |

FOREIGN PATENT DOCUMENTS

| | | | |
|---|---|---|---|
| CN | 114928180 | A | 8/2022 |
| CN | 114784994 | B | 4/2024 |
| JP | 3960447 | B2 | 5/2007 |
| JP | 6610583 | B2 | 11/2019 |
| JP | 2020115702 | A | 7/2020 |
| KR | 20140053282 | A | 5/2014 |
| KR | 101403596 | B1 | 6/2014 |
| KR | 20140071233 | A | 6/2014 |
| KR | 20160018006 | A | 2/2016 |
| KR | 20160119842 | A | 10/2016 |
| KR | 20170059391 | A | 5/2017 |
| KR | 102179796 | B1 | 11/2020 |
| KR | 20200124866 | A | 11/2020 |
| KR | 20210030131 | A | 3/2021 |
| KR | 102314318 | B1 | 10/2021 |
| KR | 20220084892 | A | 6/2022 |
| WO | 2013020138 | A2 | 2/2013 |
| WO | 2020242990 | A1 | 12/2020 |

OTHER PUBLICATIONS

Written Opinion of the ISA for PCT/KR2023/020254 mailed Mar. 11, 2024, 3 pages.

Extended European Search Report dated Apr. 20, 2026 issued in European Patent Application No. 23912660.0.

Yanling et al., "A Simultaneous Wireless Power and Data Transmission Method for Multi-Output WPT Systems: Analysis, Design, and Experimental Verification", IEEE Access IEEE, USA, vol. 8, Nov. 3, 2020, 7 pages.

Chenwen et al., "A Load-Independent Wireless Power Transfer System With Multiple Constant Voltage Outputs", IEEE Transactions On Power Electronics Institute of Electrical and Electronics Engineers, USA, vol. 35, No. 4, Sep. 9, 2019, 4 pages.

* cited by examiner

DEVICE AND METHOD FOR WIRELESS POWER TRANSMISSION IN ELECTRONIC DEVICE

CROSS-REFERENCE TO RELATED APPLICATIONS

This application is a continuation of International Application No. PCT/KR2023/020254, designating the United States, filed on Dec. 8, 2023, in the Korean Intellectual Property Receiving Office and claiming priority to Korean Patent Application Nos. 10-2022-0183859, filed on Dec. 25, 2022, and 10-2023-0004249, filed on Jan. 11, 2023, in the Korean Intellectual Property Office, the disclosures of each of which are incorporated by reference herein in their entireties.

BACKGROUND

Field

The disclosure relates to a device and method for providing wireless power transmission in an electronic device.

Description of Related Art

Wireless power transmission technology may refer to a technology that transfers electrical energy from a source to a load without using wires. The wireless power transmission technology is a technology that transfers electric energy in the form of, e.g., electromagnetic waves, inductive charging or resonant inductive coupling. It has been commercialized to receive power to perform wireless charging without place and time limitations even without wires for electronic devices, such as smartphones or digital home appliances, to which the wireless power transmission technology is applied.

Among wireless power transmission methods, the inductive charging method, although commercialized, has difficulty in being in wide use or applied to electronic devices in other various sectors than the mobile sector, due to its short transmission distance, limits in power transmission efficiency or harmfulness to the human body. Therefore, to accelerate the commercialization or popularization of wireless power transmission technology, a method for enhancing the reliability and safety of power transmission should be provided first.

SUMMARY

According to an example embodiment, an electronic device may comprise: a reception coil configured to output a first alternating current (AC) inducted from a magnetic field generated by an external electronic device, a constant voltage supply unit comprising circuitry configured to supply a constant voltage as a driving voltage of an internal circuit by the first AC output by the reception coil, and a transmission coil configured to generate a magnetic field for wireless power transmission by a second AC constant current corresponding to the constant voltage supplied from the constant voltage supply unit, wherein the constant voltage supply unit may include a first capacitor, an inductor, and a second charging scheme configured to connect an output terminal of the reception coil and an input terminal of the transmission coil in series and including a third capacitor to connect a ground and a point between the inductor and the second capacitor, wherein the driving voltage supplied to the internal circuit may be a voltage between the ground and the point between the first capacitor and the inductor.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used to denote the same or similar elements.

DETAILED DESCRIPTION

Figure 1:
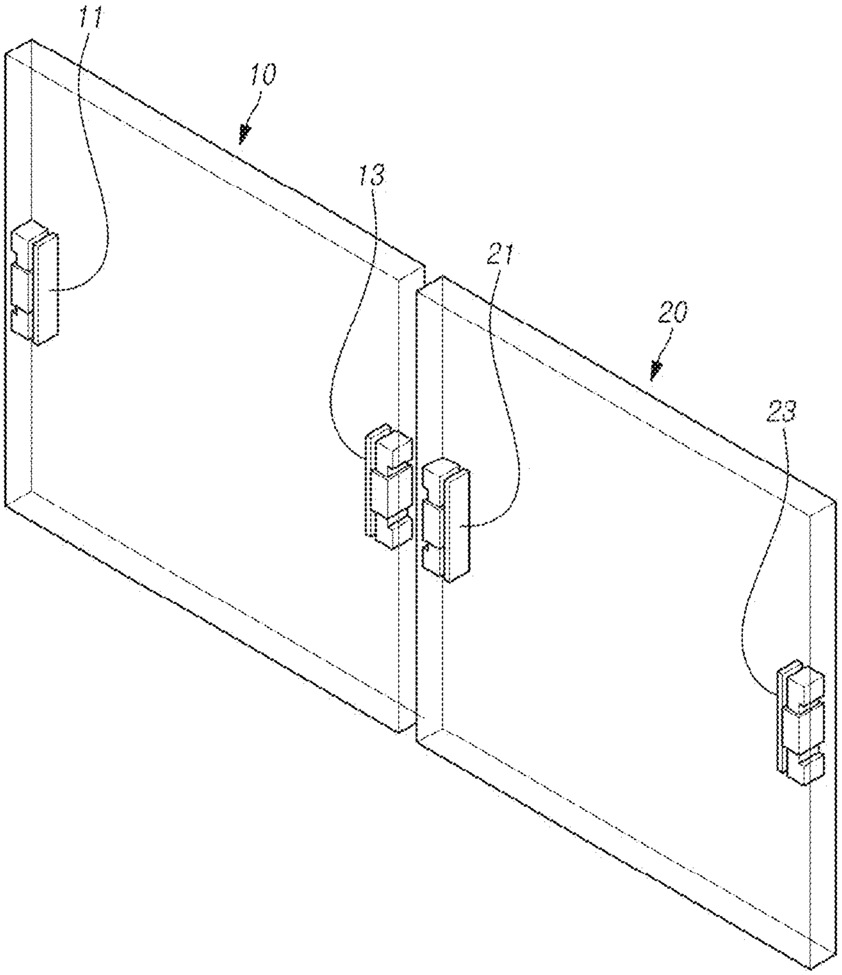
FIG. 1 is a perspective view illustrating an example connection state of an electronic device for wireless power transmission according to various embodiments.

Hereinafter, various example embodiments of the disclosure are described in greater detail with reference to the drawings. However, the disclosure may be implemented in other various forms and is not limited to the example embodiments set forth herein. The same or similar reference denotations may be used to refer to the same or similar elements throughout the disclosure and the drawings. Further, for clarity and brevity, well-known functions and configurations in the drawings and relevant descriptions may be omitted.

An example embodiment of the disclosure may provide a wireless power transmission device and method configured to supply a constant voltage by wireless power transmission in consecutively coupled electronic devices.

According to an example embodiment of the disclosure, a topology structure for wireless power transmission in an electronic device may maintain a low voltage variation rate even in a context where a load is added or changed, thereby supplying stable power supply to the load and preventing and/or reducing efficiency deterioration during wireless power transmission.

The disclosure is not limited to the foregoing, and other variations, modifications or alternatives may be derived by one of skill in the art from various example embodiments of the disclosure.

Effects of the present disclosure are not limited to the foregoing, and other unmentioned effects would be apparent to one skilled in the art from the following description.

FIG. 1 is a perspective view illustrating an example connection state of an electronic device for wireless power transmission according to various embodiments.

Referring to FIG. 1, the electronic devices 10 and 20 supporting a wireless power transmission function may include reception modules 11 and 21 or transmission modules 13 and 23. The transmission modules 13 and 23 may be magnetically coupled to the reception modules 11 and 21 by a mutual inductance phenomenon. The magnetic coupling may include, e.g., a coupling that allows a magnetic field generated by the transmission modules 13 and 23 to affect the reception modules 11 and 21.

The transmission modules 13 and 23 may be provided in an electronic device (e.g., the first electronic device 10) to supply power using a wireless power transmission function. The reception modules 11 and 21 may be provided in an electronic device (e.g., the second electronic device 20) to receive power using a wireless power transmission function. However, the first electronic device 10 may also include a reception module 11 for receiving power from another electronic device using a wireless power function. The second electronic device 20 may also include a transmission module 23 for supplying power to another electronic device using a wireless power function.

Figure 2:
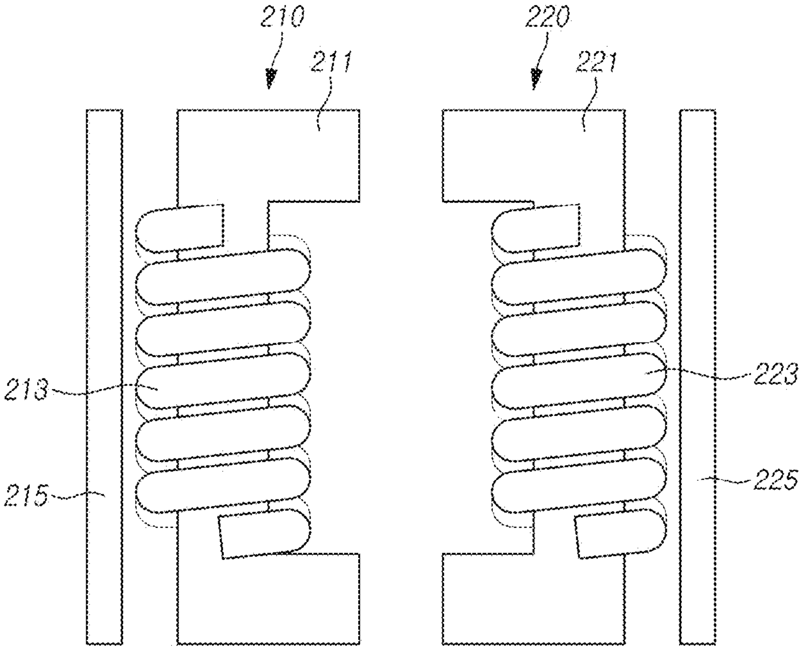
FIG. 2 is a diagram illustrating an example wireless power transmission/reception structure provided in an electronic device for wireless power transmission according to various embodiments.

The transmission modules 13 and 23 may generate non-radiative electromagnetic waves (e.g., the magnetic fields 450 and 460 of FIG. 4) by an input current (e.g., the primary current $I_1$ of FIG. 3) flowing through an internal coil (e.g., the transmission coil 213 of FIG. 2). The reception modules 11 and 21 may allow non-radiative electromagnetic waves generated by the transmission modules 13 and 23 to flow an induced current (e.g., the secondary current $I_{21}$ of FIG. 3) by a predetermined (e.g., specified) level of voltage induced to the internal coil (e.g., the reception coil 220 of FIG. 2). The voltage induced to the reception modules 11 and 21 may be defined, for example, by Faraday's law.

In FIG. 1, an example where two electronic devices 10 and 20 are connected by magnetic coupling is illustrated, but other electronic devices may be additionally connected by magnetic coupling. For example, another electronic device may be self-coupled to supply power to the first electronic device 10 using a wireless power transmission function. For example, another electronic device may be self-coupled to receive power from the second electronic device 20 using a wireless power transmission function. As such, the number of electronic devices that may be expanded by magnetic coupling may be determined based on the amount of power capable of wireless power transmission. Considering this, some of the electronic devices consecutively connected by magnetic coupling may be configured to receive power from an external power source.

Although FIG. 1 illustrates that the electronic devices 10 and 20 include one reception module 11 and 21 or one transmission module 13 and 23, the electronic devices 10 and 20 may include a plurality of reception modules or a plurality of transmission modules. Further, the electronic devices 10 and 20 show that the reception modules 11 and 21 or the transmission modules 13 and 23 are provided on two opposite sides, but they may be disposed at different positions, such as the upper side or the lower side.

FIG. 2 is a diagram illustrating an example wireless power transmission/reception structure provided in an electronic device (e.g., the first electronic device 10 or the second electronic device 20 of FIG. 1) for wireless power transmission according to various embodiments.

Referring to FIG. 2, e.g., the electronic device 10 may include a transmission module 210 and/or a reception module 220 for wireless power transmission. The transmission module 210 may form a magnetic field by supplied AC. The reception module 220 may be configured to induce a magnetic field formed by the transmission module 210 so that an alternating current (AC) flows. The transmission module 210 may be self-coupled with the reception module 220.

For example, the transmission module 210 may include a transmission ferrite core 211, a transmission coil 213, and/or a transmission ferrite partition wall 215. For example, the reception module 220 may include a reception ferrite core 221, a reception coil 223, and/or a reception ferrite partition wall 225.

The transmission coil 213 may be wound near the middle of the transmission ferrite core 211. The transmission coil 213 may serve as a medium for flowing AC supplied to one side to the other side.

The transmission ferrite core 211 may be, e.g., a magnetic material made by mixing iron oxide or zinc oxide. The transmission ferrite core 211 may assist AC to flow through the transmission coil 211. The transmission ferrite core 211 may have a shape like, e.g., a simple planar structure. The transmission ferrite core 211 may form a magnetic field by AC flowing through the transmission coil 213.

The transmission ferrite partition wall 215 may be provided between the transmission coil 213 and an internal circuit (e.g., the load $R_L$ 660 of FIG. 3) to prevent and/or reduce a magnetic field (e.g., the magnetic field 640 of FIG. 6) generated by the transmission coil 213 from leaking to the internal circuit 660. In other words, the transmission ferrite partition wall 215 may reduce a leakage magnetic field due to the magnetic field formed by the transmission ferrite core 211 on which the transmission coil 213 is wound. The reduction in the leakage magnetic field may not only reduce an effect on the human body, but also reduce an effect by a nearby metal housing.

The reception coil 223 may be wound near the middle of the reception ferrite core 221. The reception coil 223 may serve as a medium so that the AC induced through the reception ferrite core 221 may flow from one side to the other side.

The reception ferrite core 221 may be, e.g., a magnetic material made by mixing iron oxide or zinc oxide. The reception ferrite core 221 may assist an AC induced through the coil 221 to flow. The reception ferrite core 221 may have a shape like, e.g., a simple planar structure. The reception ferrite core 221 may be formed so that an AC induced by the magnetic field formed by the transmission module 210 may flow through the reception coil 223.

The reception ferrite partition wall 225 may be provided between the reception coil 223 and the internal circuit (e.g., the load $R_L$ 660 of FIG. 3) to prevent and/or reduce a magnetic field (e.g., the magnetic field 620 of FIG. 6) generated by the reception coil 223 from leaking to the internal circuit 660. In other words, the reception ferrite partition wall 225 may reduce a leakage magnetic field due to the magnetic field induced to the reception ferrite core 221 on which the reception coil 223 is wound. The reduction in the leakage magnetic field may not only reduce an effect on the human body, but also reduce an effect by a nearby metal housing.

Figure 3:
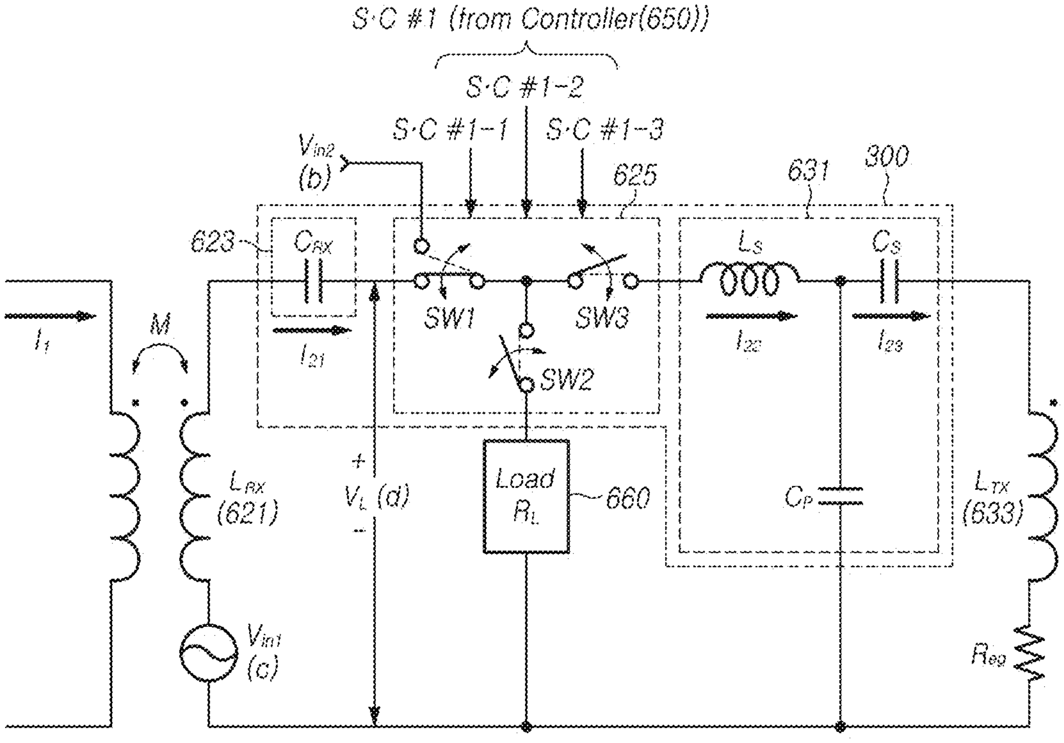
FIG. 3 is a circuit diagram illustrating an example coil structure for wireless power transmission in an electronic device according to various embodiments.

FIG. 3 is a circuit diagram illustrating an example coil structure for wireless power transmission in an electronic device (e.g., the first electronic device 10 or the second electronic device 20 of FIG. 1) according to various embodiments.

Referring to FIG. 3, the electronic device 10 may include a reception coil $L_{RX}$ 621, a constant voltage supply unit 300, a load $R_L$ 660 corresponding to an internal circuit, or a transmission coil $L_{TX}$ 633.

The reception coil $L_{RX}$ 621 may be included in a reception module (e.g., the reception module 220 of FIG. 2). The reception coil $L_{RX}$ 621 may be wound near the middle of the reception ferrite core (e.g., the reception ferrite core 221 of FIG. 2) to allow an AC induced through the reception ferrite core 221 to flow from one side to the other side. The AC induced through the reception ferrite core 221 may be likened to, e.g., supplying AC by a virtual power source $V_{in1}$.

The constant voltage supply unit 300 may supply a driving voltage $V_L$ to the load $R_L$ 660 using the AC $I_{21}$ supplied by the reception coil $L_{RX}$ 621 as an input. The driving voltage $V_L$ may be a voltage to be used for an operation of an internal circuit corresponding to the load $R_L$ 660. The constant voltage supply unit 300 may supply a driving voltage $V_L$ of a constant voltage to the load $R_L$ 660. The driving voltage $V_L$ of the constant voltage will ensure a stable operation of the internal circuit.

The constant voltage supply unit 300 may supply the primary current $I_{23}$, which is a constant current, to the transmission coil $L_{TX}$ 633 using the AC $I_{21}$ supplied by the reception coil $L_{RX}$ 621 as an input. The primary current $I_{23}$ supplied by the constant voltage supply unit 300 may cause the transmission coil $L_{TX}$ 633 to form a magnetic field to provide wireless power transmission to an external electronic device (e.g., the second electronic device 20 of FIG. 1).

According to an embodiment, the constant voltage supply unit 300 may include a reception compensation circuit 623, a switching unit 625, or a transmission compensation circuit 631. For example, the reception compensation circuit 623 may include a first capacitor $C_{RX}$. The switching unit 625 may include a first switch SW1, a second switch SW2, or a third switch SW3. The transmission compensation circuit 631 may include an inductor $L_S$, a second capacitor $C_S$, or a third capacitor $C_P$.

For example, the constant voltage supply unit 300 may be a circuit including a first capacitor $C_{RX}$, an inductor $L_S$, a second capacitor $C_S$, and a third capacitor $C_P$. The first capacitor $C_{RX}$, the inductor $L_S$, and the second capacitor $C_S$ may be disposed to connect the output terminal of the reception coil $L_{RX}$ 621 and the input terminal of the transmission coil $L_{TX}$ 633 in series. The third capacitor $C_P$ may be disposed to connect a point between the inductor $L_S$ and the second capacitor $C_S$ to the ground. A voltage between the point between the first capacitor $C_{RX}$ and the inductor $L_S$ and the ground may be supplied to a load $R_L$ 660 corresponding to an internal circuit as a driving voltage $V_L$.

The first capacitor $C_{RX}$ may function as a reception compensation circuit 623 (e.g., the reception compensation circuit 623 of FIG. 6) for stabilizing the AC $I_{21}$ induced by the reception coil $L_{RX}$ 621. For example, the first capacitor $C_{RX}$ may block and remove a DC component included in the AC $I_{21}$ induced by the reception coil $L_{RX}$ 621.

The inductor $L_S$, the second capacitor $C_S$, and the third capacitor $C_P$ may function as a transmission compensation circuit 631 (e.g., the transmission compensation circuit 631 of FIG. 6) for stabilizing the primary current to be supplied to the transmission coil $L_{TX}$ 633.

The switch unit (e.g., including at least one switch) 625 (e.g., the first switch unit 625 of FIG. 6) may supply one of the first AC $I_{21}$ supplied through the first capacitor $C_{RX}$ or the second AC $I_3$ supplied by an external power source (e.g., the power input 610 of FIG. 6) to the load $R_L$ 660 or the transmission compensation circuit 631. For example, the switch unit 625 may supply one AC selected from the first AC $I_{21}$ or the second AC $I_3$ to the transmission compensation circuit 631 by a switching control signal (e.g., the first switch control signal S.C#1 651 of FIG. 6) that is provided considering the power supply mode for designating the AC to be used for wireless power transmission, out of the first AC $I_{21}$ or the second AC $I_3$ by the controller (e.g., the controller 650 of FIG. 6). For example, the switch unit 625 may supply one AC selected from the first AC $I_{21}$ or the second AC $I_3$ to the load $R_L$ 660 by a switching control signal (e.g., the first switch control signal S.C#1 651 of FIG. 6) that is provided considering the power supply mode for designating the AC to be used for supplying the driving voltage $V_L$, out of the first AC $I_{21}$ or the second AC $I_3$ by the controller (e.g., the controller 650 of FIG. 6).

According to an example, the switch unit 625 may include three switches SW1, a second switch SW2, and a third switch SW3. In the first switch SW1, a first AC 121 may be input to one input terminal, and a second AC $I_3$ may be input to the other input terminal. The first switch SW1 may selectively output one of the first AC $I_{21}$ or the second AC $I_3$ by the switch control signal S.C#1-1 provided from the controller 650. The output terminal of the first switch SW1 may be connected to the input terminal of the second switch SW2 or the input terminal of the third switch SW3. The second switch SW2 may supply, to the load $R_L$ 660, or cut off the AC output through the first switch SW1 by the switch control signal S.C#1-2 provided from the controller 650. The third switch SW3 may supply, to the transmission compensation circuit 631, or cut off the AC output through the first switch SW1 by the switch control signal S.C#1-3 provided from the controller 650.

Table 1 below illustrates an example of operations by the switching control signals C#1-1, S.C#1-2, and S.C#1-3 provided by the controller 650.

TABLE 1

| S.C#1-1 | S.C#1-2 | S.C#1-3 | power supply mode |
|---|---|---|---|
| 0 ($I_{21}$) | 0 (off) | 0 (off) | no power usage |
| | | 1 (on) | wireless power supply mode by first AC $I_{21}$ which is inducted AC |
| | 1 (on) | 0 (off) | operation voltage supply mode by first AC $I_{21}$ which is inducted AC |
| | | 1 (on) | wireless power and operation voltage supply mode by first AC $I_{21}$ which is inducted AC |
| 1 ($I_3$) | 0 (off) | 0 (off) | no power usage |
| | | 1 (on) | wireless power supply mode by second AC $I_3$ which is external input current |
| | 1 (on) | 0 (off) | operation voltage supply mode by second AC $I_3$ which is external input current |
| | | 1 (on) | wireless power and operation voltage supply mode by second AC $I_3$ which is external input AC |

The load $R_L$ 660 may correspond to an internal circuit of the electronic device 10. The load $R_L$ 660 may receive a driving voltage $V_L$ by a current $I_{21}$ supplied by wireless power transfer or a current $I_3$ supplied from an external power source.

The transmission coil $L_{TX}$ 633 may be included in a transmission module (e.g., the transmission module 210 of FIG. 2). The transmission coil $L_{TX}$ 633 may be wound near the middle of the transmission ferrite core (e.g., the transmission ferrite core 211 of FIG. 2) to allow the AC $I_{23}$ supplied to one side to flow to the other side. The transmission coil $L_{TX}$ 633 may generate a magnetic field by the AC $I_{23}$ flowing from one side to the other side.

The circuit illustrated in FIG. 3 includes a switching unit 625 for selectively using the induced current $I_{21}$ or the external input current $I_3$ according to the power supply mode, but when only the induced current $I_{21}$ is supplied as an input, a path along which the current is to be directly supplied without the switching unit 625 may be connected.

According to the LC-LCC topology circuit illustrated in FIG. 3, a constant voltage for a stable operation of the load $R_L$ 660 may be supplied.

For example, assuming that the current $I_1$ flowing through the transmission coil (e.g., the transmission coil 213 of FIG. 2) included in the transmission module (e.g., the transmission coil 213 of FIG. 2) to form a magnetic field is constant, the voltage $V_{ind,\ TX\text{-}RX}$ induced in the reception coil $L_{RX}$ 621 may be defined as Equation 1 below.

$$V_{ind,TX\text{-}RX} = j\omega MI_1 \qquad \text{[Equation 1]}$$

Here, ω denotes each frequency, and M denotes mutual inductance between the transmission coil and the reception coil.

According to Equation 1, the voltage $V_{ind,\ TX\text{-}RX}$ induced to the reception coil $L_{RX}$ 621 may be constant.

Based on Equation 1, if Kirchhoff's voltage law (KVL) is applied to the loop through which currents $I_{21}$, $I_{22}$, and $I_{23}$ flow, a determinant as illustrated in Equation 2 below may be obtained.

$$\begin{bmatrix} j\omega L_{RX} + \frac{1}{j\omega C_{RX}} + R_L & -R_L & 0 \\ -R_L & R_L + j\omega L_{RX} + \frac{1}{j\omega C_p} & -\frac{1}{j\omega C_p} \\ 0 & -\frac{1}{j\omega C_p} & \frac{1}{j\omega C_p} + \frac{1}{j\omega C_s} + j\omega L_{TX} + R_{eq} \end{bmatrix} = \begin{bmatrix} j\omega MI_1 \\ 0 \\ 0 \end{bmatrix} \qquad \text{[Equation 2]}$$

According to an example, three resonance conditions in the LC-LCC topology circuit may be defined as illustrated in Equation 3 below.

$$\omega = \frac{1}{\sqrt{L_{RX}C_{RX}}} = \frac{1}{\sqrt{L_S C_P}} = \frac{1}{\sqrt{(L_{TX} - L_S)C_S}} \qquad \text{[Equation 3]}$$

If the three resonance conditions defined by Equation 3 are met and the first and second rows are added in the matrix defined in Equation 2, Equation 4 may be derived below.

$$I_{23} = \omega^2 C_p MI_1 \qquad \text{[Equation 4]}$$

According to Equation 4, it may be identified that the current flowing through the transmission coil is constant regardless of the load.

The voltage $V_L$ applied to the load resistance $R_L$ in the first row of the determinant defined in Equation 2 may be defined as in Equation 5 below.

$$V_L = (I_{21} - I_{22})R_L = j\omega MI_1 \qquad \text{[Equation 5]}$$

According to Equation 5, it may be identified that the voltage applied to the load $R_L$ 660 is constant.

Summarizing the above, it may be identified that the LC-LCC topology circuit according to an example has the following two characteristics.

(1) The voltage applied to the load $R_L$ 660 may maintain a constant voltage regardless of the characteristics of the load $R_L$ 660

(2) The current $I_{21}$ flowing through the transmission coil $L_{RX}$ 621 may maintain a constant current regardless of the characteristics of the load $R_L$ 660

Figure 4:
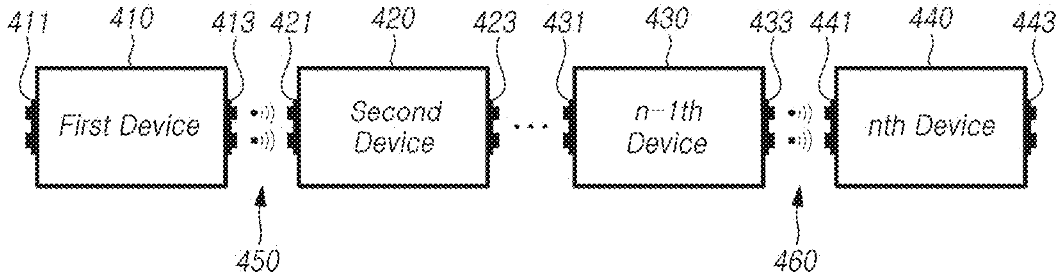
FIG. 4 is a diagram illustrating an example coupling relationship between devices of a multi-wireless power transmission system according to various embodiments.

FIG. 4 is a diagram illustrating an example coupling relationship between devices of a multi-wireless power transmission system 400 according to various embodiments.

Referring to FIG. 4, in a multi-wireless power transmission system 400, a plurality of devices 410, 420, 430, and 440 may be connected in series by magnetic coupling 450 and 460. The plurality of devices 410, 420, 430, and 440 may include reception modules 411, 421, 431, and 441 (e.g., the reception module 220 of FIG. 2) and/or transmission modules 413, 423, 433, and 443 (e.g., the transmission module 210 of FIG. 2) for self-coupling.

For example, the first device 410 may generate non-radiative electromagnetic waves by an input current (e.g., the primary current $I_1$ of FIG. 3) flowing through the internal coil (e.g., the transmission coil 213 of FIG. 2) of the transmission module 413. The first device 410 may provide a current to the transmission module 413 using induced power supplied based on a wireless power transmission function from another electronic device or external power supplied from an external power source. The first device 410 may supply a driving voltage (e.g., the driving voltage $V_L$ of FIG. 3) for operating an internal circuit (e.g., the load $R_L$ of FIG. 3) using the induced power or the external power.

For example, the second device 420 may allow an induced current (e.g., the secondary current $I_{21}$ of FIG. 3) according to a predetermined level of voltage induced to the internal coil (e.g., the reception coil 220 of FIG. 2) of the reception module 421 by the non-radiative electromagnetic wave generated by the transmission module 413 of the first device 410. The second device 420 may provide a current to the transmission module 423 using the induced current. The second device 420 may supply a driving voltage (e.g., the driving voltage $V_L$ of FIG. 3) for operating an internal circuit (e.g., the load $R_L$ 660 of FIG. 3) using the induced current.

For example, the n−1th device 430 may generate a non-radiative electromagnetic wave by an input current (e.g., the primary current $I_1$ of FIG. 3) flowing through the internal coil (e.g., the transmission coil 213 of FIG. 2) of the transmission module 433. The n−1th device 430 may provide current to the transmission module 433 using induced power supplied based on the wireless power transmission function from the n−2th electronic device. The n−1th device 430 may supply a driving voltage (e.g., the driving voltage $V_L$ of FIG. 3) for operating an internal circuit (e.g., the load $R_L$ of FIG. 3) using the induced power.

For example, the nth device 440 may allow, to flow, an induced current (e.g., the secondary current $I_{21}$ of FIG. 3) according to a predetermined level of voltage induced to the internal coil of the reception module 441 (e.g., the reception coil 220 of FIG. 2) by the non-radiative electromagnetic wave generated by the transmission module 433 of the n−1th device 430. The nth device 440 may provide a current to the transmission module 443 using the induced current. The nth device 440 may supply a driving voltage (e.g., the driving voltage $V_L$ of FIG. 3) for operating an internal circuit (e.g., the load $R_L$ of FIG. 3) using the induced current.

According to the above, the multi-wireless power transmission system 400 may have a structure in which n devices (the first device 410, the second device 420, . . . , the n−1th device 430, and the nth device 440) are connected by a wireless power transmission chain.

Figure 5:
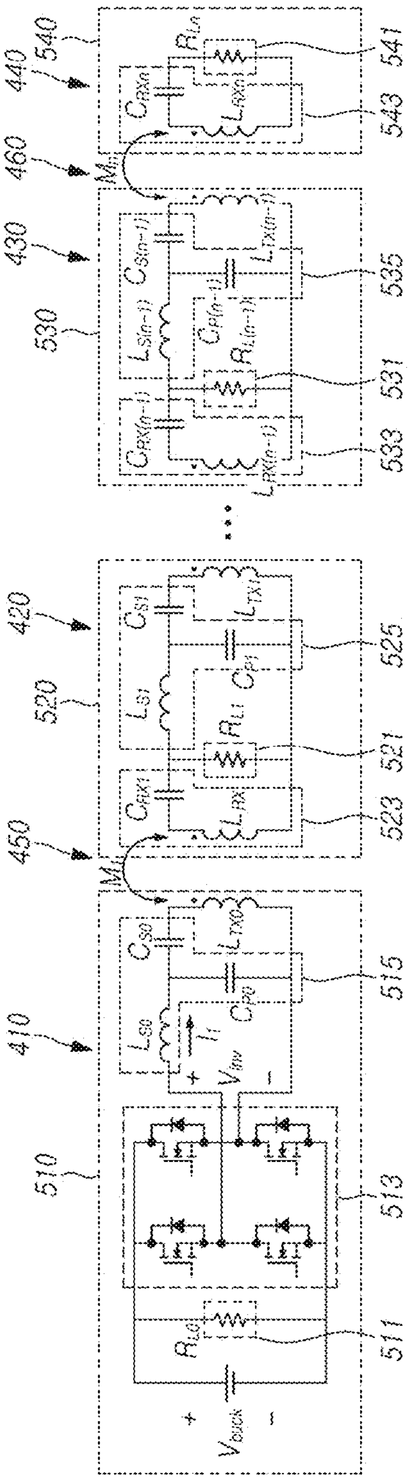
FIG. 5 is a circuit diagram illustrating an example multi-wireless power transmission system according to various embodiments.

FIG. 5 is a circuit diagram illustrating an example multi-wireless power transmission system (e.g., the multi-wireless power transmission system 400 of FIG. 4) according to various embodiments.

Referring to FIG. 5, in the multi-wireless power system 400, a plurality of devices 410, 420, 430, and 440 may be connected in series by magnetic coupling 450 and 460. The plurality of devices 410, 420, 430, and 440 may be, e.g., n devices (e.g., first device 410 to nth device 440).

For example, the first device 410 may include a circuit 510 to supply an operating voltage for the load $R_{LO}$ 511 corresponding to the internal circuit using power supplied from an external power source, or to perform a wireless power transmission function. For example, the first device 410 may include an inverter 513 for converting a direct current (DC) $V_{buck}$ provided using an AC supplied from an external power source into an AC in order to perform a wireless power transmission function. The first device 410 may include a transmission compensation circuit 515 for maintaining the AC converted by the inverter 513 at a constant level. The transmission compensation circuit 515 may include, e.g., one inductor $L_{S0}$ and two capacitors $C_{S0}$ and $C_{P0}$. The first device 410 may generate a magnetic field for wireless power transmission by allowing an AC corresponding to the constant current obtained by the transmission compensation circuit 515 to flow through the transmission coil $L_{TX0}$.

For example, the second device 420 may include a circuit 520 to supply an operating voltage for the load $R_{L1}$ 521 corresponding to the internal circuit using an AC induced by the magnetic field generated by the first device 410, or to perform a wireless power transmission function. The second device 420 may include a reception compensation circuit 523 for stabilizing the induced current, e.g., to perform a wireless power transmission function. The reception compensation circuit 523 may include, e.g., a capacitor $C_{RX1}$. The second device 420 may supply an operating voltage for the load $R_{L1}$ 521 corresponding to the internal circuit using the AC passing through the reception compensation circuit 523. The second device 420 may include a transmission compensation circuit 525 for maintaining the AC passing through the reception compensation circuit 523 at a constant level. The transmission compensation circuit 525 may include, e.g., one inductor $L_{S1}$ and two capacitors $C_{S1}$ and $C_{P1}$. The second device 420 may generate a magnetic field for wireless power transmission by allowing an AC corresponding to the constant current obtained by the transmission compensation circuit 525 to flow through the transmission coil $L_{TX1}$.

For example, the n−1th device 430 may include a circuit 530 to supply an operating voltage for the load $R_{L(n-1)}$ 531 corresponding to the internal circuit using an AC induced by the magnetic field generated by the n−2th device (not illustrated), or to perform a wireless power transmission function. The n−1th device 430 may include a reception compensation circuit 533 to stabilize the induced current, e.g., to perform a wireless power transmission function. The reception compensation circuit 533 may include, e.g., a capacitor $C_{RX(n-1)}$. The n−1th device 430 may supply an operating voltage for the load $R_{L(n-1)}$ 531 corresponding to the internal circuit using the AC passing through the reception compensation circuit 533. The n−1th device 430 may include a transmission compensation circuit 535 for maintaining the AC passing through the reception compensation circuit 533 at a constant level. The transmission compensation circuit 535 may include, e.g., one inductor $L_{S(n-1)}$ and two capacitors $C_{S(n-1)}$ and $C_{P(n-1)}$. The n−1th device 430 may generate a magnetic field for wireless power transmission by allowing an AC corresponding to the constant current obtained by the transmission compensation circuit 535 to flow through the transmission coil $L_{TX(n-1)}$.

For example, the nth device 440 may include a circuit 540 to supply an operating voltage for the load $R_{Ln}$ 541 corresponding to the internal circuit using an AC induced by the magnetic field generated by the n−1th device 430. The nth device 440 may include a reception compensation circuit 543 for stabilizing the induced current, e.g., to perform a wireless power transmission function. The reception compensation circuit 543 may include, e.g., a capacitor $C_{RXn}$. The nth device 440 may supply an operating voltage for the load $R_{Ln}$ 541 corresponding to the internal circuit using the AC passing through the reception compensation circuit 543.

Figure 6:
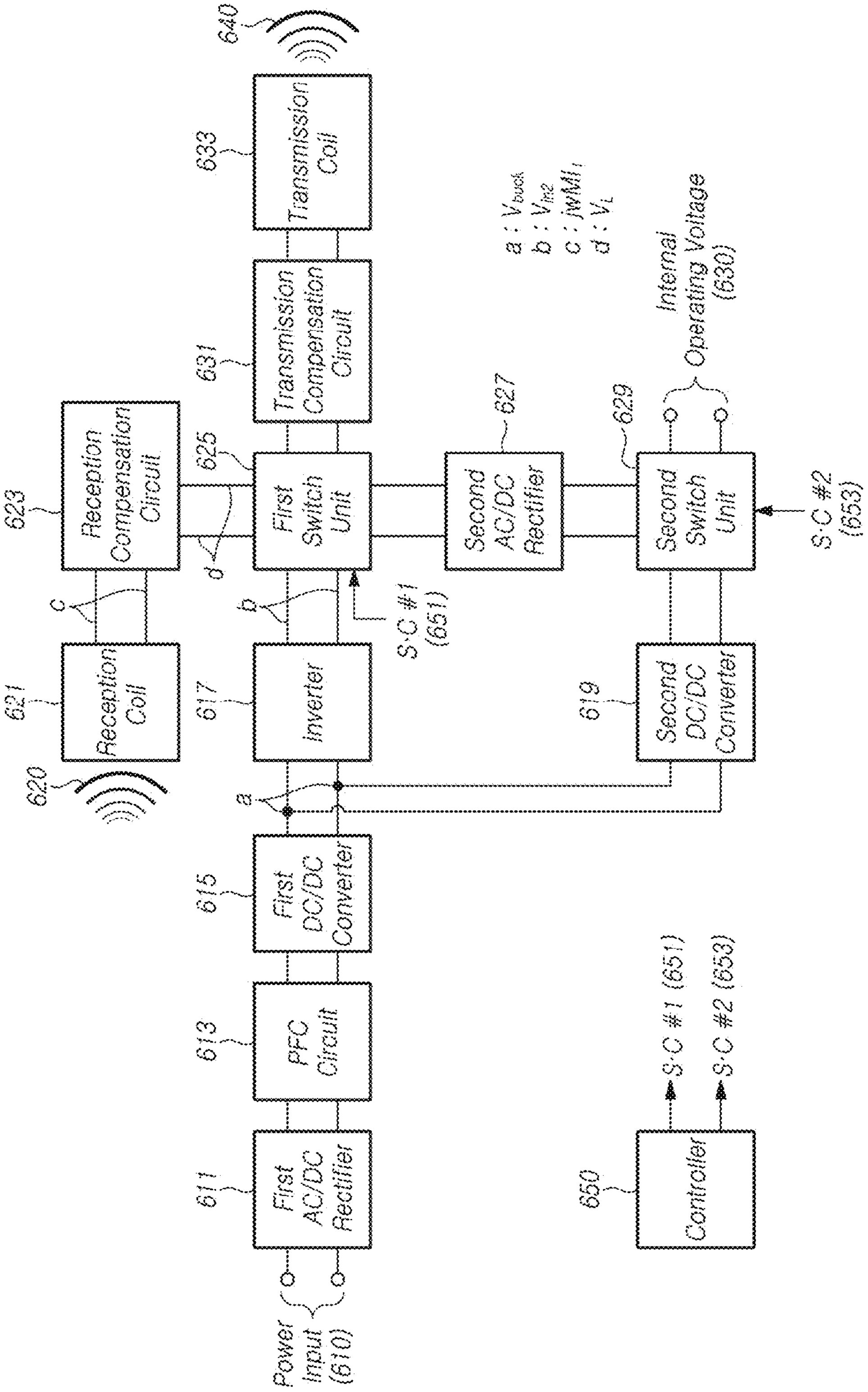
FIG. 6 is a block diagram illustrating an example configuration for supplying power in an electronic device according to various embodiments.

FIG. 6 is a block diagram illustrating an example configuration for supplying power in an electronic device (e.g., the first electronic device 10 or the second electronic device 20 of FIG. 1) according to various embodiments.

Referring to FIG. 6, the electronic device 10 may form a driving voltage $V_L$ for the operation of an internal circuit (e.g., the load 660 of FIG. 3) and/or a magnetic field 640 for wireless power transfer using at least one of external power supplied from an external power source or induced power supplied in a wireless power transmission method.

According to an embodiment, the electronic device 10 may include a first AC/DC rectifier 611, a power factor correction (PFC) circuit 613, a first DC/DC converter 615, an inverter 617, a reception coil 621, a reception compensation circuit 623, a first switch unit 625, a transmission compensation circuit 631, a transmission coil 633, a second DC/DC converter 619, a second AC/DC rectifier 627, and/or a second switch unit 629.

The first AC/DC rectifier 611 may convert a power input 610 that is an AC supplied from an external power source into a DC. The power input 610 may be an alternating current (AC) having a predetermined level of voltage (e.g., 110V or 220V) and a frequency (e.g., 50 Hz or 60 Hz). For example, the power input 610 may be supplied through a plug inserted into an outlet outputting AC.

The PFC circuit 613 may provide power factor enhancement for correcting the phase deviation between voltage and current by controlling the average value of DC provided as the first AC/DC rectifier 611 rectifies the AC supplied from the outside and provides the same to become a sine wave. For example, the PFC circuit 613 may enhance the power factor for the output of the first AC/DC rectifier 611 to be close to 1. This makes the power factor angle (phase angle) close to 0 degrees, thereby reducing the phase difference between the voltage and the current so that the surface power approaches the effective power. The PFC circuit 613 may suppress a harmonic current included in the output of the first AC/DC rectifier 611.

The first DC/DC converter 615 may convert a DC voltage level output by the PFC circuit 613 into a desired voltage level and output the same. For example, the first DC/DC converter 615 may buck or boost the DC of a specific current or voltage using a power electronic semiconductor device. "Bucking" may refer, for example, to converting a high-voltage DC into low-voltage DC. "Boosting" may refer, for example, to converting a low-voltage DC into a high-voltage DC.

The inverter 617 may convert the DC output from the first DC/DC converter 615 into an AC. For example, the inverter 617 may include a plurality of switching elements (e.g., FETs or diodes).

The reception coil 621 may be included in a reception module (e.g., the reception module 220 of FIG. 2). The reception coil 621 may be wound near the middle of a reception ferrite core (e.g., the reception ferrite core 221 of FIG. 2) to allow an AC induced through the reception ferrite core 221 to flow from one side to the other side.

The reception compensation circuit 623 may include a capacitor (e.g., the first capacitor $C_{RX}$ of FIG. 3). The reception compensation circuit 623 may perform a function for stabilizing the AC induced by the reception coil 621. For example, the reception compensation circuit 623 may remove a DC component (e.g., a ripple component) included in the AC induced by the reception coil 621.

The first switch unit 625 may supply one of a first AC supplied from the reception compensation circuit 623 or a second AC supplied from the inverter 617 to an internal circuit (e.g., the load $R_L$ 660 of FIG. 3) or the transmission compensation circuit 631. For example, the first switch unit 625 may supply one AC selected from the first AC or the second AC to the transmission compensation circuit 631 by the first switch control signal S.C#1 651 provided from the controller 650. For example, the first switch unit 625 may supply one selected from the first AC $I_{21}$ or the second AC $I_3$ to the load $R_L$ 660 by the first switch control signal S.C#1 651 provided from the controller 650.

The transmission compensation circuit 631 may include an inductor $L_S$, a second capacitor $C_S$, and a third capacitor $C_P$. The transmission compensation circuit 631 stabilizes the AC transferred through the first switch unit 625 so that a constant current may be supplied to the transmission coil 633.

The transmission coil 633 may be included in a transmission module (e.g., the transmission module 210 of FIG. 2). The transmission coil 633 may be wound near the middle of the transmission ferrite core (e.g., the transmission ferrite core 211 of FIG. 2) to allow an AC supplied to one side to flow to the other side. The transmission coil 633 may generate a magnetic field 640 by the AC flowing from one side to the other side.

The second DC/DC converter 619 may convert the voltage level of the DC output by the first DC/DC converter 615 into a desired voltage level and output the same. For example, the second DC/DC converter 619 may buck or boost the DC of a specific current or voltage using a power electronic semiconductor device. "Bucking" may refer, for example, to converting a high-voltage DC into low-voltage DC. "Boosting" may refer, for example, to converting a low-voltage DC into a high-voltage DC.

The second AC/DC rectifier 627 may convert the AC transferred through the first switch unit 625 into a DC having a voltage level required by an internal circuit.

The second switch unit 629 may transfer one of a first DC provided from the second DC/DC converter 619 or a second DC provided from the second AC/DC rectifier 627 to the internal operating voltage 630 to be supplied to an internal circuit (e.g., the load $R_L$ 660 of FIG. 3). For example, the second switch unit 629 may supply one DC selected from the first DC or the second DC to an internal circuit (e.g., the load $R_L$ 660 of FIG. 3) by the second switch control signal S.C#2 653 provided from the controller 650.

The controller 650 may include various processing circuitry and determine an AC to be used for wireless power transmission out of the first AC or the second AC considering the power supply mode, and output the first switch control signal S.C#1 651 to the first switch unit 625 to match the determination.

The controller 650 may determine an AC to be used to supply the driving voltage $V_L$ out of the first AC or the second AC considering the power supply mode, and output the first switch control signal S.C#1 651 or the second switch control signal S.C#2 653 to the first switch unit 625 to match the determination.

An example of the controller 650 outputting the first switch control signal S.C#1 651 or the second switch control signal S.C#2 653 according to the power supply mode may be the same as described above with reference to Table 1.

Figure 7:
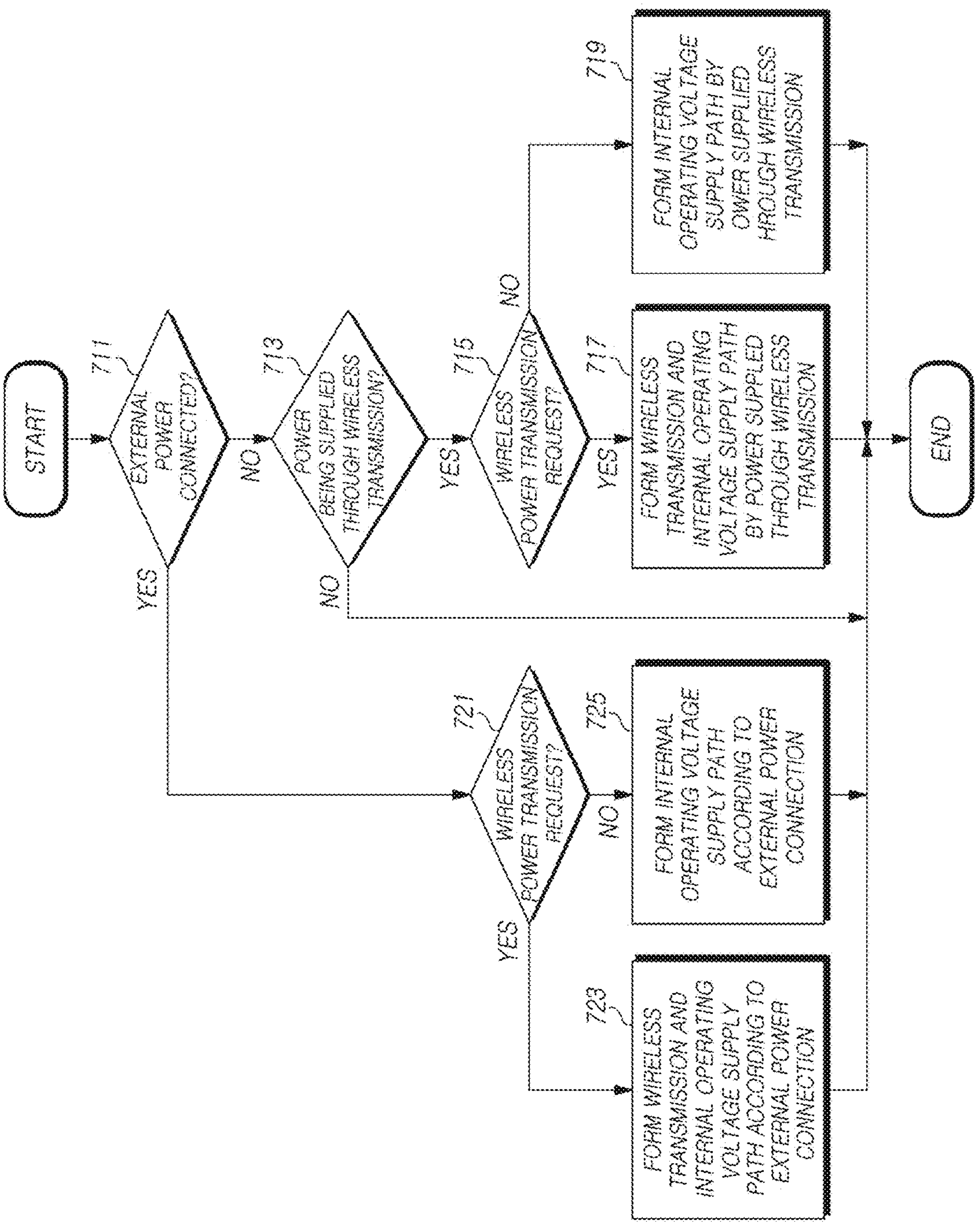
FIG. 7 is a flowchart illustrating example operations for controlling power supply in an electronic device according to various embodiments.

FIG. 7 is a flowchart illustrating example operations for controlling power supply in an electronic device (e.g., the first electronic device 10 of FIG. 1) according to various embodiments. The following description assumes that the corresponding operation is performed by the first electronic device 10 of FIG. 1, but the operation may be performed not only by the first electronic device 10, but also by the second electronic device 20 of FIG. 1 or the n devices (the first device 410 to the nth device 440) illustrated in FIG. 4.

Referring to FIG. 7, in operation 711, the electronic device 10 may determine whether an external power source is connected. The external power source may be a power source for supplying an alternating current (AC) having a predetermined level of voltage (e.g., 110V or 220V) and a frequency (e.g., 50 Hz or 60 Hz). For example, the external power source may be an outlet that outputs AC. In the case, the electronic device 10 may determine that an external power source is connected by plugging into the outlet.

When the external power source is connected, in operation 721, the electronic device 10 may determine whether there is a request for wireless power transmission to the first external electronic device. The wireless power transmission request may be made by an event requiring wireless power transmission to the first external electronic device. For example, the event may be generated by a request for wireless power transmission from the first external electronic device. For example, the event may be generated by the user requesting wireless power transmission to the first external electronic device. For example, the event may occur for the purpose of performing wireless charging, receiving an internal operating voltage from the outside, or supplying an operating voltage to the outside.

When there is a wireless power transmission request while the external power source is connected, the electronic device 10 may transmit wireless power and/or supply internal operating power using AC, which is power supplied from the external power source, in operation 723. For example, the electronic device 10 may rectify the AC supplied from the external power source into a DC having a predetermined voltage level (e.g., 12V), convert the DC by the rectification into a desired voltage level, and use it as internal operating power. The electronic device 10 may convert (invert) the converted DC into an AC, and generate a magnetic field for wireless power transmission using the converted AC.

When there is no wireless power transmission request while the external power source is connected, the electronic device 10 may supply internal operating power using an AC, which is power supplied from the external power source, in operation 725. For example, the electronic device 10 may rectify the AC supplied from the external power source into a DC having a predetermined voltage level (e.g., 12V), convert the DC by the rectification into a desired voltage level, and use it as internal operating power.

When the external power source is not connected, in operation 713, the electronic device 10 may determine whether it is in a state capable of receiving power from the second external electronic device by wireless power transmission. The state capable of receiving power by the wireless power transmission may correspond to a 'wireless power supply state'. The power supply by the wireless power transmission may be implemented by one of, e.g., an inductive charging method, a resonant inductive coupling method, and an electromagnetic wave method. For example, wireless power transmission by the inductive charging method may induce a magnetic field (e.g., the magnetic field 620 of FIG. 6) formed by the transmission coil (e.g., the transmission coil 213 of FIG. 2) in the reception coil (e.g., the reception coil 223 of FIG. 2), allowing an induced current (e.g., AC) to flow through the reception coil 223.

When power is supplied by wireless power transmission while the external power is not connected, the electronic device 10 may determine whether there is a wireless power transmission request to the first external electronic device in operation 715. The wireless power transmission request may be made by an event requiring wireless power transmission to the first external electronic device. For example, the event may be generated by a request for wireless power transmission from the first external electronic device. For example, the event may be generated by the user requesting wireless power transmission to the first external electronic device. For example, the event may occur for the purpose of performing wireless charging, receiving an internal operating voltage from the outside, or supplying an operating voltage to the outside.

When there is a wireless power transmission request while power is being supplied by the wireless power transmission, the electronic device 10 may supply wireless power transmission and/or internal operating power using AC, which is power supplied through wireless power transmission, in operation 717. For example, the electronic device 10 may rectify the AC supplied through the wireless power transmission into a DC having a desired voltage level and use the same as internal operating power. The electronic device 10 may generate a magnetic field for wireless power transmission using the AC supplied through wireless power transmission.

When there is no wireless power transmission request while power is being supplied by the wireless power transmission, the electronic device 10 may supply internal operating power using the AC, which is power supplied through wireless power transmission, in operation 719. For example, the electronic device 10 may rectify the AC which is power supplied through the wireless power transmission into a DC having a desired voltage level and use the same as internal operating power.

According to an example, an electronic device 20 may comprise a reception coil $L_{RX}$ 621 configured to output a first alternating current AC $I_{21}$ inducted from a magnetic field 620 generated by an external electronic device 10. The electronic device 20 may comprise a constant voltage supply unit 300 configured to supply a constant voltage as a driving voltage $V_L$ of an internal circuit 660 by the first AC $I_{21}$ output by the reception coil $L_{RX}$ 621. The electronic device 20 may comprise a transmission coil $L_{TX}$ 633 configured to generate a magnetic field 640 for wireless power transmission by a second AC $I_{23}$ which is a constant current corresponding to the constant voltage supplied from the constant voltage supply unit 300.

As an example, the constant voltage supply unit 300 may be configured to have a first capacitor $C_{RX}$, an inductor $L_S$, and a second charging scheme to connect an output terminal of the reception coil $L_{RX}$ 621 and an input terminal of the transmission coil $L_{TX}$ 633 in series and to have a third capacitor $C_P$ to connect a ground and a point between the inductor $L_S$ and the second capacitor $C_S$. The driving voltage $V_L$ supplied to the internal circuit 660 may be a voltage between the ground and the point between the first capacitor $C_{RX}$ and the inductor $L_S$.

As an example, the constant voltage supply unit 300 may include a first switch unit 625 provided to selectively supply one of the first AC $I_{21}$ supplied through the first capacitor $C_{RX}$ or a third AC $I_3$ supplied by an external power source 610 to the internal circuit 660 or the inductor $L_S$.

As an example, the first switch unit 625 may include a first switch SW1 configured to selectively output the first AC $I_{21}$ or the third AC $I_3$. The first switch unit 625 may include a second switch SW2 configured to switch a path for supplying a selection AC output through the first switch SW1 to the internal circuit 660. The first switch unit 625 may include a third switch SW3 configured to switch a path for supplying the selection AC to the inductor $L_S$.

As an example, the electronic device 20 may comprise a controller 650 configured to output a switching control signal 651 S.C#1-1, S.C#1-3 for controlling the first switch SW1 or the third switch SW3 according to a power supply mode for designating an AC to be used for the wireless power transmission, out of the first AC $I_{21}$ or the third AC $I_3$.

As an example, the electronic device 20 may comprise a controller 650 configured to output a switching control signal 651 S.C#1-1, S.C#1-2 for controlling the first switch SW1 or the second switch SW2 according to a power supply mode for designating an AC to be used for supplying the driving voltage $V_L$, out of the first AC $I_{21}$ or the third AC $I_3$.

As an example, the electronic device 20 may comprise a rectifier 627 configured to convert an AC supplied by the first switch unit 625 into a direct current (DC).

As an example, the electronic device 20 may comprise a converter 619 configured to adjust a level of a DC $I_{buck}$ supplied by the external power source 610.

As an example, the electronic device 20 may comprise a second switch unit 629 provided to selectively supply one of a first DC output from the rectifier 627 or a second DC output from the converter 619 to the internal circuit 660.

As an example, the electronic device 20 may comprise a controller 650 configured to output a switching control signal 653 S.C#2 for controlling the second switch unit 629 according to a power supply mode for designating an AC to be used for supplying the driving voltage $V_L$, out of the first AC $I_{21}$ or the third AC $I_3$.

As an example, the electronic device 20 may comprise a transmission partition wall 215 provided between the transmission coil $L_{TX}$ 633 and the internal circuit 660 and configured to prevent and/or reduce a magnetic field 640 generated by the transmission coil $L_{TX}$ 633 from leaking to the internal circuit 660.

As an example, the electronic device 20 may comprise a reception partition wall 225 provided between the reception coil $L_{RX}$ 621 and the internal circuit 660 and configured to prevent and/or reduce a magnetic field 620 generated by the external electronic device 10 from leaking to the internal circuit 660.

As an example, the electronic device 20 may comprise an inverter 617 configured to convert a DC $I_{buck}$ created by an AC supplied by the external power source 610 into the third AC $I_3$.

As an example, the electronic device 20 may comprise a reception compensation circuit 623 configured to remove a DC component included in an AC $I_{21}$ induced by the reception coil $L_{RX}$ 621 between the reception coil $L_{RX}$ 621 and the first switch unit 625.

As an example, the reception compensation circuit 623 may include the first capacitor $C_{RX}$.

As an example, the electronic device 20 may comprise a transmission compensation circuit 631 configured to perform stabilization on an AC transferred through the first switch unit 625 to supply a constant current to the transmission coil $L_{TX}$ 633.

As an example, the transmission compensation circuit 631 may include the inductor $L_S$, the second capacitor $C_S$, and the third capacitor $C_P$.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., memory) that is readable by a machine (e.g., the electronic device 10). For example, a processor (e.g., the controller 650) of the machine (e.g., the electronic device 10) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modifications, alternatives or variations may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a reception coil configured to output a first alternating current (AC) inducted from a first magnetic field;

a constant voltage supply unit comprising circuitry configured to supply a constant voltage by the first AC output by the reception coil; and a transmission coil configured to generate a second magnetic field for wireless power transmission by a second AC including a constant current corresponding to the constant voltage supplied from the constant voltage supply unit, wherein the constant voltage supply unit includes a first capacitor, an inductor, and a second charging scheme configured to connect an output terminal of the reception coil and an input terminal of the transmission coil in series and to have a third capacitor to connect a ground and a point between the inductor and the second capacitor.

2. The electronic device of claim 1, wherein a voltage between the ground and a point between the first capacitor and the inductor is supplied as a driving voltage of an internal circuit.

3. The electronic device of claim 1, wherein the first magnetic field is generated by an external electronic device.

4. The electronic device of claim 1, wherein the constant voltage supply unit includes a first switch unit including at least one switch configured to selectively supply one of the first AC supplied through the first capacitor or a third AC supplied by an external power source to an internal circuit or the inductor.

5. The electronic device of claim 1, comprising a first switch configured to selectively output the first AC supplied through the first capacitor or a third AC supplied by an external power source.

6. The electronic device of claim 5, further comprising a second switch configured to switch a path for supplying a selection AC output through the first switch to the internal circuit.

7. The electronic device of claim 5, further comprising a third switch configured to switch a path for supplying a selection AC output through the first switch to the inductor.

8. The electronic device of claim 7, comprising a controller comprising circuitry configured to output a switching control signal to control the first switch and/or the third switch according to a power supply mode for designating an AC to be used for the wireless power transmission, out of the first AC or the third AC.

9. The electronic device of claim 6, comprising a controller comprising circuitry configured to output a switching control signal to control the first switch and/or the second switch according to a power supply mode for designating an AC to be used for supplying the driving voltage, out of the first AC or the third AC.

10. The electronic device of claim 4, comprising:

a rectifier configured to convert an AC supplied by the first switch unit into a direct current (DC);

a converter comprising circuitry configured to adjust a level of a DC supplied by the external power source; and a second switch unit comprising at least one switch configured to selectively supply one of a first DC output from the rectifier or a second DC output from the converter to the internal circuit.

11. The electronic device of claim 10, comprising a controller comprising circuitry configured to output a switching control signal to control the second switch unit according to a power supply mode for designating an AC to be used for supplying a driving voltage of the internal circuit, out of the first AC or the third AC.

12. The electronic device of claim 1, comprising a transmission partition wall provided between the transmission coil and an internal circuit and configured to prevent and/or reduce the second magnetic field from leaking to the internal circuit.

13. The electronic device of claim 1, comprising a reception partition wall provided between the reception coil and an internal circuit and configured to prevent and/or reduce the first magnetic field from leaking to the internal circuit.

14. The electronic device of claim 4, comprising an inverter configured to convert a DC created by an AC supplied by the external power source into the third AC.

15. The electronic device of claim 4, comprising a reception compensation circuit configured to remove a DC component included in an AC induced by the reception coil between the reception coil and the first switch unit.

16. The electronic device of claim 15, wherein the reception compensation circuit includes the first capacitor.

17. The electronic device of claim 4, comprising a transmission compensation circuit configured to perform stabilization on an AC transferred through the first switch unit to supply a constant current to the transmission coil.

18. The electronic device of claim 17, wherein the transmission compensation circuit includes the inductor, the second capacitor, and the third capacitor.

19. The electronic device of claim 1, comprising a transmission ferrite core, wherein the transmission coil is wound around the transmission ferrite core.

20. The electronic device of claim 1, comprising a reception ferrite core, wherein the reception coil is wound around the reception ferrite core.

* * * * *